US012065948B1

(12) United States Patent
Kling

(10) Patent No.: US 12,065,948 B1
(45) Date of Patent: Aug. 20, 2024

(54) BLADE SPACER

(71) Applicant: RAYTHEON TECHNOLOGIES CORPORATION, Farmington, CT (US)

(72) Inventor: Colin J. Kling, Souderton, PA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/207,909

(22) Filed: Jun. 9, 2023

(51) Int. Cl.
*F01D 5/30* (2006.01)
*F01D 5/32* (2006.01)

(52) U.S. Cl.
CPC ........... *F01D 5/3007* (2013.01); *F01D 5/323* (2013.01); *F01D 5/326* (2013.01); *F05D 2220/32* (2013.01); *F05D 2220/36* (2013.01); *F05D 2230/60* (2013.01)

(58) Field of Classification Search
CPC ........ F01D 5/3007; F01D 5/323; F01D 5/326; F05D 2220/32; F05D 2220/36; F05D 2230/60
See application file for complete search history.

(56) References Cited

U.S. PATENT DOCUMENTS 3,936,234 A * 2/1976 Tucker .................... F01D 5/323 416/221
5,123,813 A * 6/1992 Przytulski ............... F01D 5/323 403/372
5,236,309 A * 8/1993 Van Heusden ......... F01D 5/323 416/221
5,522,702 A * 6/1996 Kemsley ................. F01D 5/326 416/221
8,439,635 B2 * 5/2013 Uskert .................... F01D 9/042 415/189
9,739,160 B2 * 8/2017 Kain ......................... F01D 5/30
9,840,922 B2 12/2017 Whitehurst
2010/0284805 A1 * 11/2010 Uskert .................... F01D 5/323 415/209.3
2013/0156591 A1 * 6/2013 Alexander ............ F01D 5/3092 416/221
2015/0176417 A1 * 6/2015 Zelmer ..................... F01D 5/14 416/221

FOREIGN PATENT DOCUMENTS

FR 3121954 10/2022
WO WO-2008022890 A1 * 2/2008 ........... F01D 5/3015
WO 2021170780 9/2021

* cited by examiner

*Primary Examiner* — Brian Christopher Delrue
(74) *Attorney, Agent, or Firm* — Carlson, Gaskey & Olds, P.C.

(57) ABSTRACT

A fan includes a rotor hub comprising a slot and a blade comprising an airfoil extending from a blade root in a first direction. The blade root is configured to be received in the slot. The fan also includes a deformable spacer situated between the rotor hub and the blade root in the slot, a first blade lock situated at a first side of the slot, and a second blade lock situated at a second side of the slot opposite the first side. At least one of the first and second blade locks includes a tab configured to extend between the blade root and the rotor hub and to compress the spacer such that the spacer exerts a force on the blade in the first direction. A method of assembling a fan and another example fan are also disclosed.

5 Claims, 5 Drawing Sheets

BLADE SPACER

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to blades within the gas turbine engine and specifically in the fan section. Blades are in some examples retained with respect to a rotor hub at least in part by a spacer situated between a blade root and the hub which exerts a force on the blade to keep it in place. However, there is a need for spacers which exert enough force on a blade to keep it in place, especially during windmilling conditions, but not so high a force that the spacer is difficult to install/remove from the hub and that the spacer or neighboring hardware is at risk of damage from the force.

SUMMARY

A fan according to an exemplary embodiment of this disclosure, among other possible things includes a rotor hub comprising a slot and a blade comprising an airfoil extending from a blade root in a first direction. The blade root is configured to be received in the slot. The fan also includes a deformable spacer situated between the rotor hub and the blade root in the slot, a first blade lock situated at a first side of the slot, and a second blade lock situated at a second side of the slot opposite the first side. At least one of the first and second blade locks includes a tab configured to extend between the blade root and the rotor hub and to compress the spacer such that the spacer exerts a force on the blade in the first direction.

In a further example of the foregoing, the spacer comprises an elastomeric material.

In a further example of any of the foregoing, the first blade lock includes the tab. The first blade lock is attached to the rotor hub by a fastener.

In a further example of any of the foregoing, torqueing the fastener compresses the spacer.

In a further example of any of the foregoing, the fan is a fan of a gas turbine engine.

In a further example of any of the foregoing, the first blade lock includes the tab. The first blade lock is situated forward of the second blade lock within the gas turbine engine.

A method of assembling a fan according to an exemplary embodiment of this disclosure, among other possible things includes inserting a root of a fan blade into a slot in a rotor hub. The fan blade includes an airfoil section extending from the root in a first direction. The method also includes inserting a spacer in to the slot between the fan blade root and the rotor hub and attaching a blade lock to the rotor hub. The blade lock includes a tab extending between the fan blade root and the rotor hub. The attaching causes the tab to compress the spacer, thereby exerting a force on the fan blade root in the first direction.

In a further example of the foregoing, the attaching includes torqueing a fastener.

In a further example of any of the foregoing, the spacer comprises an elastomeric material.

In a further example of any of the foregoing, the method also includes releasing compression of the spacer by at least partially releasing the blade lock from the rotor hub.

In a further example of any of the foregoing, the fan is a fan of a gas turbine engine.

In a further example of any of the foregoing, the blade lock is a forward blade lock.

A fan according to an exemplary embodiment of this disclosure, among other possible things includes a rotor hub comprising a slot and a blade comprising an airfoil extending from a blade root in a first direction. The blade root is configured to be received in the slot. The fan also includes a spacer situated between the rotor hub and the blade root in the slot. The spacer includes at least one rod, a first end plate at a first end of the rod, a second end plate at a second end of the rod, and a third end plate between the first and second endplates. A first segment of a sleeve is situated between the first end plate and the second end plate and surrounding the rod. A second segment of the sleeve is situated between the second end plate and the third end plate and surrounding the rod. Moving at least one of the first, second, and third end plates towards another of the first, second, and third endplates compresses at least one of the first and second segments of the sleeve such that the spacer exerts a force on the blade in the first direction.

In a further example of the foregoing, the first and second segments of the sleeve comprise an elastomeric material.

In a further example of any of the foregoing, the first, second, and third endplates comprise a metallic or composite material.

In a further example of any of the foregoing, the first, second, and third endplates comprise a softer material than a material of the rotor hub.

In a further example of any of the foregoing, the at least one rod comprises a metallic material.

In a further example of any of the foregoing, the at least one rod comprises multiple parallel rods.

In a further example of any of the foregoing, at least one of the first, second, and third endplates is movable by the application of a torque.

In a further example of any of the foregoing, the fan is a fan of a gas turbine engine. The first direction is a radial direction with respect to a central axis of the gas turbine engine.

DETAILED DESCRIPTION

Figure 1:
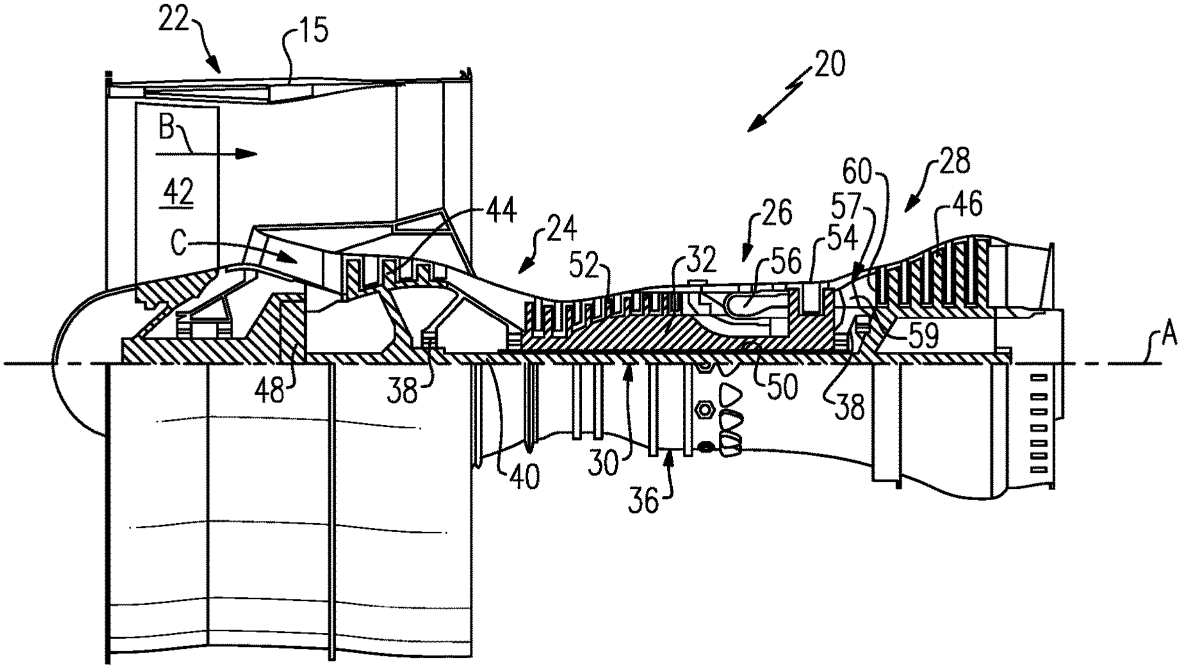
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 42 in the fan section 22 disclose an example gas turbine engine 20 with increased power transfer efficiency.

Blades such as fan blades 42 are installed into a rotor hub under a load, which can be provided by a spacer structure, to prevent windmilling. Some blade design may require comparatively greater loads to prevent windmilling than other designs. These higher loads may result in unacceptably high installation and removal loads for the spacer, which risk injury to the technician and damage to the spacer or neighboring hardware. Accordingly, the present description relates to a spacer for a blade that exerts just enough force to hold the blade in place in the hub without over-loading the blade and risking damage to the blade. The present spacer design has other advantages which will be appreciated from the present description.

Figure 2B:
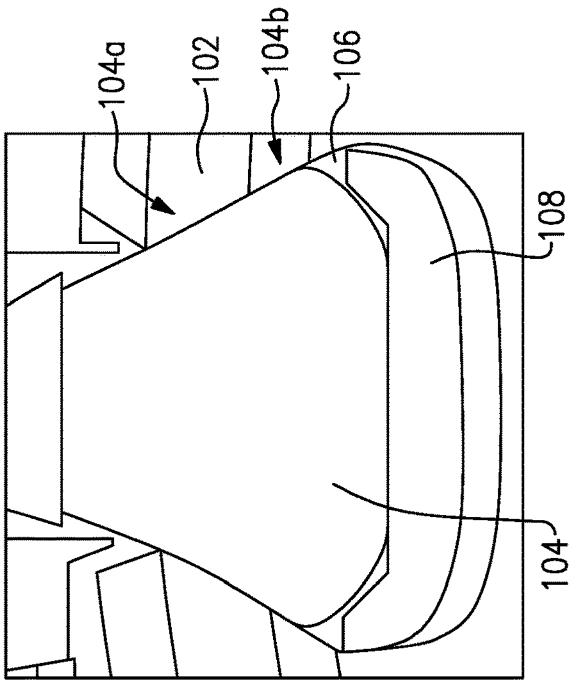
FIG. 2B shows a section view of FIG. 2A.
Figure 2A:
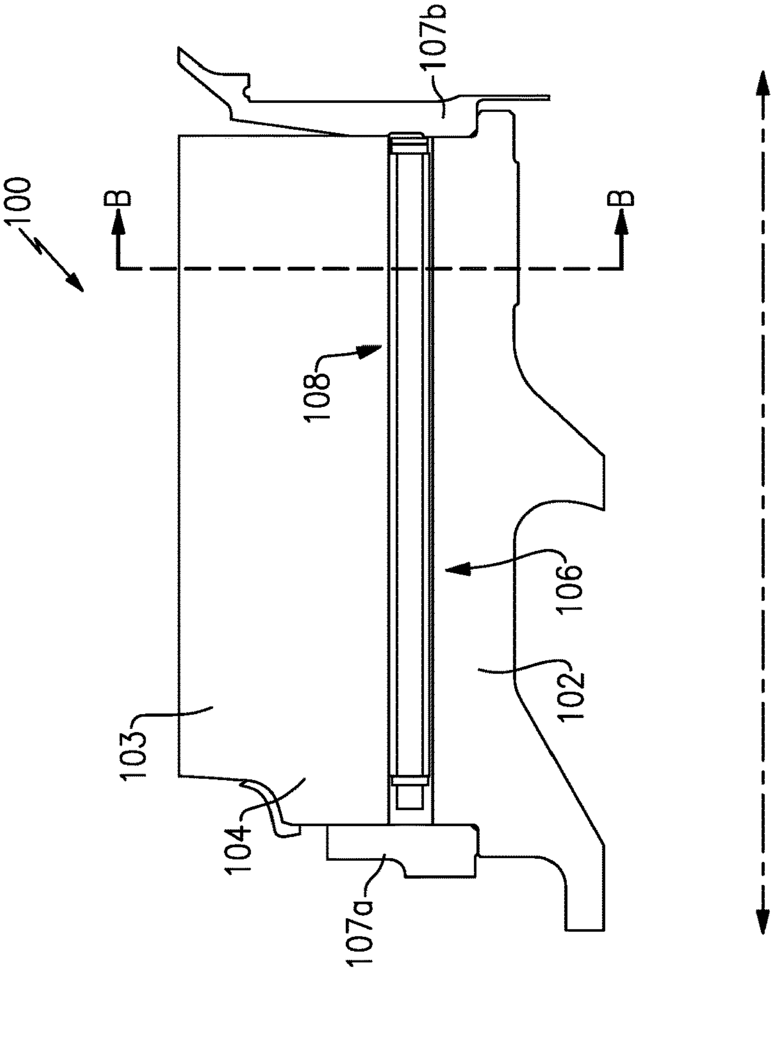
FIG. 2A schematically illustrates an example fan blade installed in a rotor hub with a spacer.

FIGS. 2A-B schematically illustrate an example blade 100 installed in a rotor hub 102. FIG. 2B shows a section view of FIG. 2A along the axis B-B. In a particular example, the blade 100 is a fan blade 42 and the rotor hub 102 is a rotor hub in the fan section 22. The blade 100 has an airfoil section 103 and a blade root 104 at its radially innermost end with respect to the engine axis A. The blade root 104 is configured to be received in a corresponding slot 106 of the rotor hub 102. The blade root 104 could have any number of geometries or configurations known in the art, but in general includes a neck portion **104*a* radially outward from the airfoil portion and a terminal portion 104*b* radially outward from the neck portion 104***a* which is wider than the neck portion 104*a*. The geometry of the corresponding slot 106 generally tracks the geometry of the blade root 104.

Because of the close relative geometry of the blade root 104 and the slot 106, the slot 106 is oversized in a radial direction with respect to the blade root 104 so that the blade root 104 can be installed into the slot 106. To that end, a spacer is situated in the slot 106 between the slot 106 and the blade root 104. The spacer is configured to bias the blade root 104 radially outward when in the installed position. Friction forces between the blade root 104, spacer, and slot 106 hold the blade root 104 in place. A forward blade lock 107*a* and an aft blade lock 107*b* serve as axial stoppers for the blade root 104 and the spacer. In this way, the blade root 104 is secured in the slot 106 and the blade is secured with respect to the rotor hub 102. This is especially important when the fan section 22 experiences windmilling conditions.

Figure 3A:
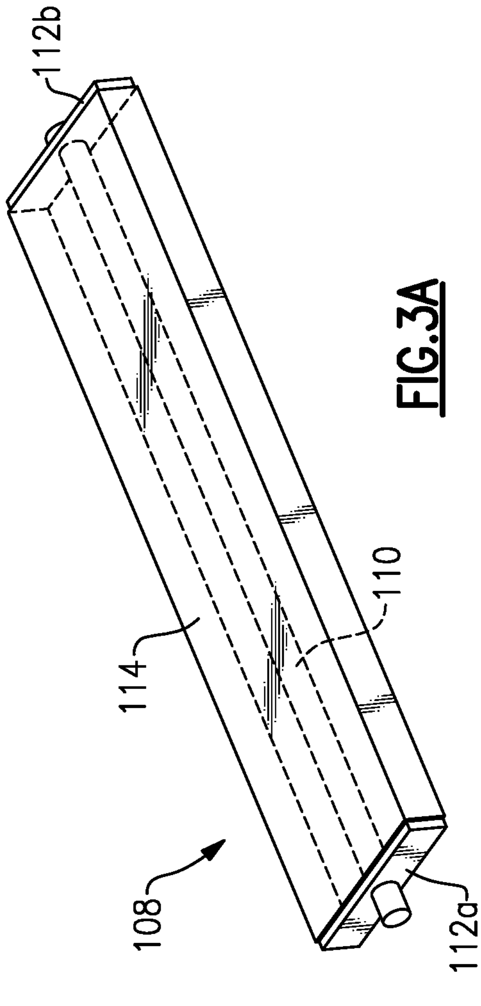
FIG. 3A shows an isometric view of the spacer in FIG. 2.
Figure 3B:
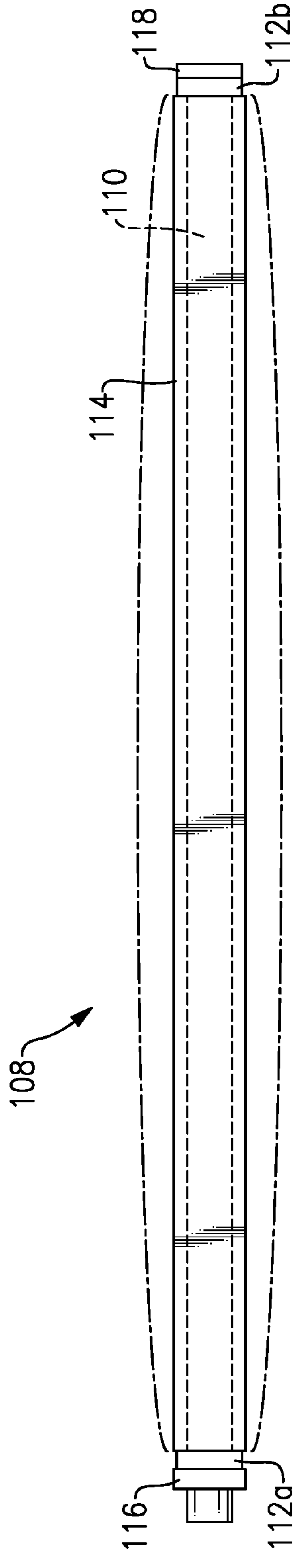
FIG. 3B show a side view of the spacer in FIG. 2.

FIGS. 3A-B show detail views of an example spacer 108. With continued reference to FIGS. 2A-B and 3A-B, in general, the spacer 108 is configured to be compressed in an axial direction, causing the spacer 108 to expand in radial and circumferential directions and exert a biasing force on the blade root 104 as discussed above. The use of terms “axial,” “radial,” and “circumferential” when made in reference to the spacer 108 herein should be understood with respect to the central engine axis A.

In particular, the spacer 108 includes a rod 110, at least two endwalls 112*a*/112*b* at either end of the rod 110. In this example, the spacer 108 includes one rod 110, but it should be understood that multiple parallel rods 110 could also be used.

A deformable sleeve 114 surrounds the rod 110. At least one of the endwalls 112*a*/112*b* are configured to move with respect to the rod 110 and towards the other of the endwalls 112*a*/112*b* in an axial direction, compressing the sleeve 114 and causing it to expand in radial and circumferential directions to a notional geometry as shown in dashed lines in FIG. 3B. The amount of expansion of the sleeve 114 is variable based on the positioning of the endwalls 112*a*/112*b* relative to one another and can be selected based on the blade 100 characteristics. In this way, the endwalls 112*a*/112*b* can be positioned to provide just enough force to hold the blade 100 in place in the hub 102 without over-loading the blade 100 and risking damage to the blade 100. In other words, the amount of compression, and therefore force exerted on the blade root 104, can be selected.

Moreover, the expansion of the sleeve 114 is reversible. That is, the sleeve 114 can be expanded an unexpanded as needed. For instance, once the blade root 104 is situated in the slot 106, the spacer 108 can be inserted into the slot 106 with the sleeve 114 in an unexpanded state, in which the spacer 108 has dimensions that provide a line-on-line fit or a slight clearance between the spacer 108 and the slot 106/blade root 104 for easy assembly. Once the blade root 104 and spacer 108 are situated in the slot 106, one or both of the endwalls 112*a*/112*b* is moved toward the other of the endwalls 112*a*/112*b* to expand the sleeve 114, exert a biasing force on the blade root 104 as discussed above, and hold the blade 104 with respect to the rotor hub 102. To remove the blade 100 from the rotor hub 102, one or both of the endwalls 112*a*/112*b* is moved away from the other of the endwalls 112*a*/112*b* to return the sleeve 114 to its unexpanded state, removing the biasing force on the blade root 104 and allowing the blade 100 and/or spacer 108 to be removed from the slot 106.

In some examples, the rod 110 is metallic, the sleeve 114 is an elastomeric material, and the endwalls 112*a*/112*b* comprise metallic or composite materials. In a particular example, the endwalls 112*a*/112*b* comprise a softer material than the blade root 104 and the rotor hub 102, reducing the likelihood that the endwalls 112*a*/112*b* would damage the blade root 104/rotor hub 102.

In one example, one or both of the endwalls 112*a*/112*b* are moved by application of torque to the rod 110, one or both of the endwalls 112*a*/112*b*, or another feature such as a nut received on the rod 110. For instance, the rod 110 is threaded or has a threaded portion and a nut 116 is received on the threaded portion of the rod 110 adjacent the endwall 112*a*. Torqueing the nut 116 moves the endwall 112*a* towards the endwall 112*b*. Other configurations are contemplated. For example endwall 112*a* could have threads corresponding to a threaded portion of the rod 110, and torqueing the rod 110 itself would cause the endwall 112*a* to move towards the endwall 112*b*.

In one example, one endwall 112*b* is held in place with respect to the rod 110 by a flange 118 on the rod 110, and the other endwall 112*a* is movable with respect to the rod 110. For the case described above where the endwall 112*a* is moved by torqueing, in this example, the threaded portion of the rod 110 is at or near the endwall 112*a*.

Figure 3C:
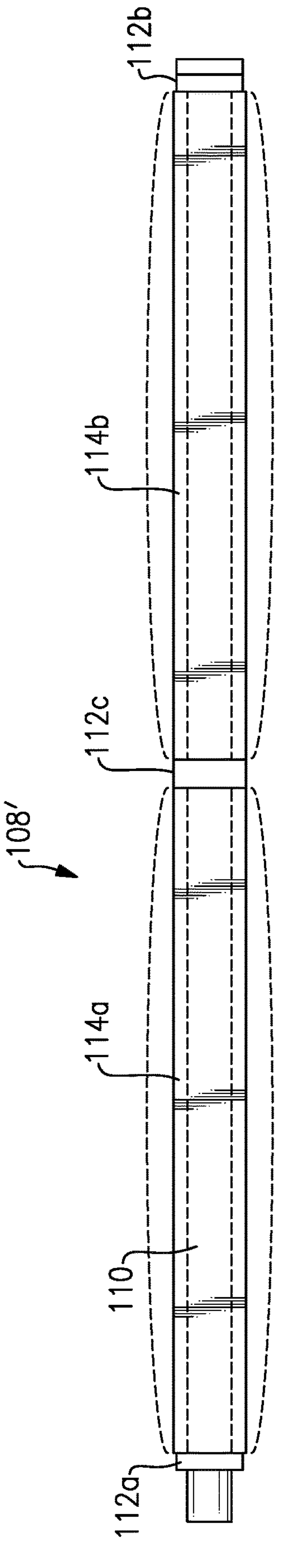
FIG. 3C shows an isometric view of another example spacer.

FIG. 3C shows another example spacer 108' similar to the spacer 108 discussed above. In this example, however, the spacer 108 includes an additional endwall 112*c* dividing the sleeve 114 into segments 114*a*/114*b*. The endwall 112*c* is movable toward the endwalls 112*a* or the endwall 112*b* to selectively compress or expand the segments 114*a*/114*b* of the sleeve 114. In this way the biasing force can be tailored to be applied to specific areas of the blade root 104 for selectively biasing the blade root 104 within the slot 106. Though in this example there are three endwalls, more endwalls could be used in other examples.

Figure 4:
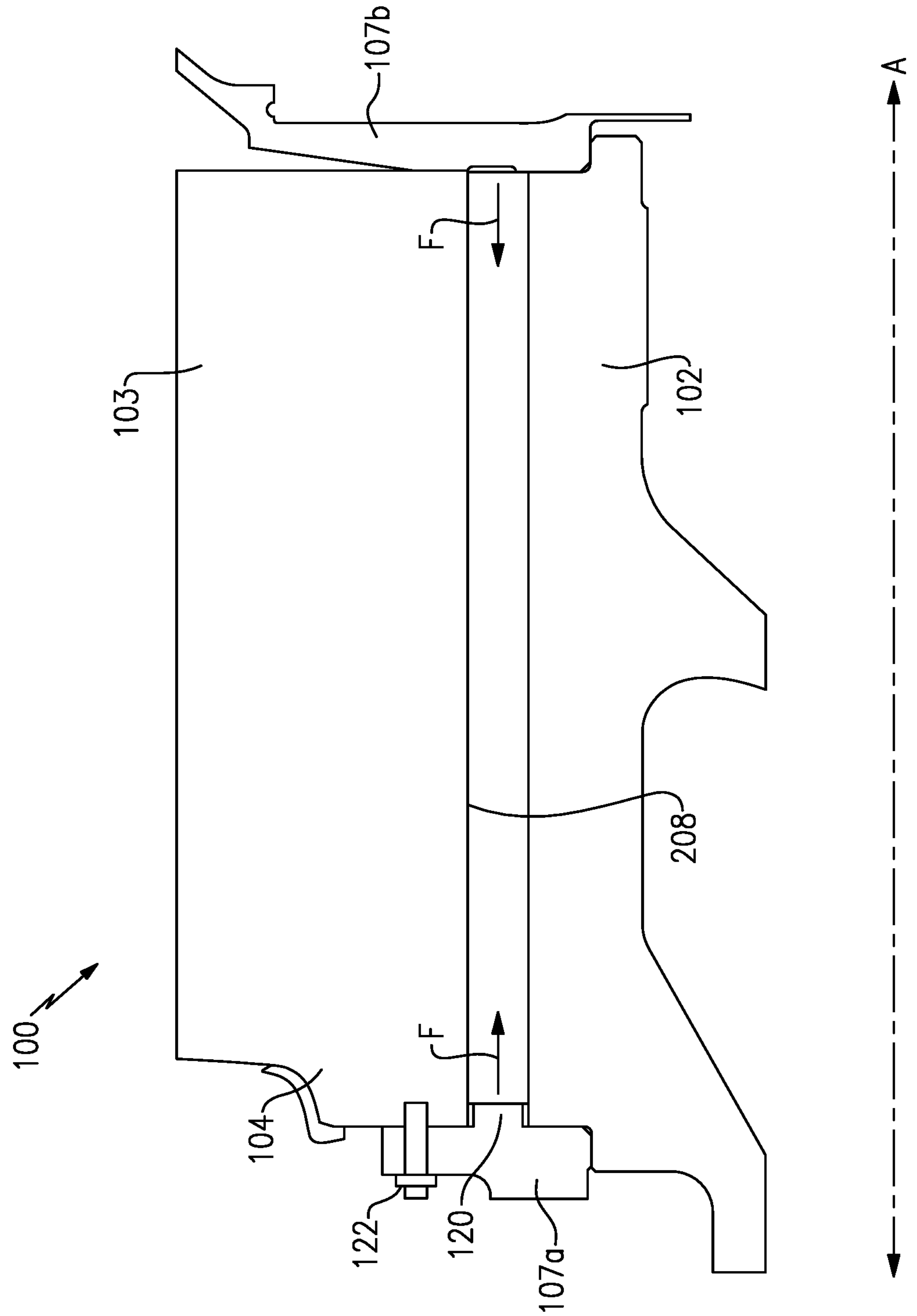
FIG. 4 schematically illustrates an example fan blade installed in a rotor hub with another example spacer.

FIG. 4 shows another example spacer 208 situated between the blade root 104 and rotor hub 102. In this example the spacer 208 comprises the sleeve 114. One or both of the forward blade lock 107*a* and the aft blade lock 107*b* include a tab 120 configured to extend between the blade root 104 and the rotor hub 102 when the aft blade lock 107*b* is in the installed position as shown in FIG. 2. Specifically, the tab 120 contacts and compresses the sleeve 114 against the other of the forward blade lock 107*a*/aft blade lock 107*b*, causing the sleeve 114 to expand in the axial and circumferential directions just as for the spacer 108/108' discussed above. In the example of FIG. 4, the forward blade lock 107*a* includes the tab 120.

The forward and aft blade locks 107*a*/107*b* are attached to the rotor hub by a fastener or set of fasteners such as bolts 122. Torqueing the bolt(s) 122 forces F the forward and aft blade locks 107*a*/107*b* towards the rotor hub 102 and towards one another. Accordingly, torqueing the bolt(s) 122 also causes the tab 120 to compress the sleeve 114. Conversely, releasing the bolt(s) 122 causes the tab 120 to reduce/release compression of the sleeve 114. In this way, the spacer 208 can be selectively and removably compressed just like the spacer 108/108'. The spacer 208 can be installed in the slot 106 like the spacer 108/108' as discussed above. To remove the blade 100 from the rotor hub 102, the blade lock 107*a*/107*b* having the tab 120 is removed or partially released from the rotor hub 102 to release compression of the spacer 208 and return it to its unexpanded state, removing the biasing force on the blade root 104 and allowing the blade 100 and/or spacer 108 to be removed from the slot 106.

As used herein, the term “about” and “approximately” have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A fan, comprising:

a rotor hub comprising a slot;

a blade comprising an airfoil extending from a blade root in a first direction, the blade root configured to be received in the slot;

a deformable spacer situated between the rotor hub and the blade root in the slot;

a first blade lock situated at a first side of the slot;

a second blade lock situated at a second side of the slot opposite the first side, wherein at least one of the first and second blade locks includes a tab configured to extend between the blade root and the rotor hub and to compress the spacer such that the spacer exerts a force on the blade in the first direction; and wherein the first blade lock includes the tab, and wherein the first blade lock is attached to the rotor hub by a fastener, the fastener is torqued to compress the spacer.

2. The fan of claim 1, wherein the spacer comprises an elastomeric material.

3. The fan of claim 1, wherein the fan is a fan of a gas turbine engine.

4. The fan of claim 3, wherein the first blade lock includes the tab, and wherein the first blade lock is situated forward of the second blade lock within the gas turbine engine.

5. The fan of claim 1, wherein the fan is a fan of a gas turbine engine, and wherein the first direction is a radial direction with respect to a central axis of the gas turbine engine.

* * * * *